US008787445B2

(12) United States Patent
Pore et al.

(10) Patent No.: US 8,787,445 B2
(45) Date of Patent: Jul. 22, 2014

(54) ALLOCATION OF AVAILABLE BITS TO REPRESENT DIFFERENT PORTIONS OF VIDEO FRAMES CAPTURED IN A SEQUENCE

(75) Inventors: Vinayak Pore, Pune (IN); Soumenkumar Dey, Pune (IN); Vikas Patel, Noida (IN)

(73) Assignee: Nvidia Corporation, Santa Clara, CA (US)

( * ) Notice: Subject to any disclaimer, the term of this patent is extended or adjusted under 35 U.S.C. 154(b) by 1580 days.

(21) Appl. No.: 11/686,955

(22) Filed: Mar. 15, 2007

(65) Prior Publication Data

US 2008/0225944 A1 Sep. 18, 2008

(51) Int. Cl.
*H04N 7/12* (2006.01)
*H04N 11/04* (2006.01)
*H04B 1/66* (2006.01)
*H04N 7/32* (2006.01)
*H04N 7/26* (2006.01)
*H04N 7/50* (2006.01)

(52) U.S. Cl.
USPC ............ 375/240.01; 375/240.03; 375/240.12; 375/240.24; 382/103; 382/173; 382/254; 382/282; 348/14.13

(58) Field of Classification Search
USPC ............. 375/240.01, 240.03, 240.24, 240.12; 382/254, 282, 232, 103, 173; 348/14.13
See application file for complete search history.

(56) References Cited

U.S. PATENT DOCUMENTS

| 2003/0123751 | A1* | 7/2003 | Krishnamurthy et al. ..... 382/282 |
| 2003/0128756 | A1* | 7/2003 | Oktem ...................... 375/240.03 |
| 2005/0024487 | A1* | 2/2005 | Chen .......................... 348/14.13 |
| 2006/0062478 | A1* | 3/2006 | Cetin et al. .................... 382/232 |
| 2006/0083305 | A1* | 4/2006 | Dougherty et al. ...... 375/240.12 |
| 2007/0183663 | A1* | 8/2007 | Wang et al. .................... 382/173 |
| 2008/0152245 | A1* | 6/2008 | El-Maleh et al. ............. 382/254 |
| 2012/0213409 | A1* | 8/2012 | El-Maleh et al. ............. 382/103 |

FOREIGN PATENT DOCUMENTS

WO WO 2012175722 A1 * 12/2012

OTHER PUBLICATIONS

Mavlankar, A.; Varodayan, D.; Girod, B.; "Region-of-interest prediction for interactively streaming regions of high resolution video"; Packet Video 2007; Digital Object Identifier: 10.1109/PACKET.2007.4397027; Publication Year: Jul. 2007, pp. 68-77.*

Yu Sun, Dongdong Li, Ishfaq Ahmad and Jiancong Luo, "A Rate Control Algorithm for Wireless Video Transmission Using Perceptual Tuning", Proceedings of the International Conference on Information Technology: Coding and Computing (ITCC'05), 0-7695-2315-3/05 IEEE, pp. 1 -6.

(Continued)

*Primary Examiner* — Kambiz Zand
*Assistant Examiner* — Courtney Fields

(57) ABSTRACT

A technique of encoding video frames allocates an available number of bits to different portions of the video frame. A processing unit identifies a region of interest (ROI) in a video frame, and computes a first and second complexity parameter respectively representing the change in video information in the ROI portions and non-ROI portions in the video frame relative to a reference frame. Bits are allocated to the ROI portion proportional (positive correlation) to the first complexity parameter and a ratio of the area of the ROI to the area of the frame. The remaining available bits are allocated to the non-ROI. In an embodiment, the bits are encoded according to H.264 standard.

11 Claims, 11 Drawing Sheets

(56) References Cited

OTHER PUBLICATIONS

Lin Tong and K. R. Rao, "Region of Interest Based H.263 Compatible Codec and ITSRATE Control for Low Bit Rate Video Conferecing", Proceedings of 2005 International Symposium on Intelligent Signal Processing and Communication Systems, pp. 249-252, Dec. 13-16, 2005.

Pierpaolo Baccichet, Xiaoqing Zhu, and Bernd Girod, "Network-Aware H.264/AVC Region-of-Interest Coding for a Multi-Camera Wireless Surveillance Network", pp. 1-6, Downloaded Mar. 2007.

Yu Sun, Member, IEEE, Ishfaq Ahmad, Senior Member, IEEE, Dongdong Li, Student Member, IEEE, and Ya-Qin Zhang, Fellow, IEEE, "Region-Based Rate Control and Bit Allocation for Wireless Video Transmission", IEEE Transactions on Multimedia, Vol. 8, No. 1, pp. 1-10, Feb. 2006.

Jeng-Wei Chen, Mei-Juan Chen and Ming-Chieh Chi, "Region-of-Interest Video Coding Based on Face Detection", Springer-Verlag Berlin Heidelberg, pp. 1201-1211, Year 2002.

Pierpaolo Baccichet, "H.264/AVC compliant solutions for SLEP-based error robustness and for video surveillance", I.E.I.I.T.—National Research Center Turin—Italy, pp. 1-29, Stanford, Dec. 9, 2005.

* cited by examiner

ALLOCATION OF AVAILABLE BITS TO REPRESENT DIFFERENT PORTIONS OF VIDEO FRAMES CAPTURED IN A SEQUENCE

RELATED APPLICATIONS

The present application is related to the following co-pending US applications, which are both incorporated in their entirety into the present application:

Entitled, "Auto-Focus technique in an image capture device", filed: on even date herewith, Ser. No. 11/686,958, inventors: Garg et al; and Entitled, "Auto-Exposure Technique in a Camera", filed: on even date herewith, Ser. No. 11/686,956, inventors: Dey et al.

BACKGROUND

1. Field of Disclosure

The present disclosure relates generally to video systems, and more specifically to allocation of available bits to represent different portions of video frames captured in a sequence.

2. Related Art

A video frame generally refers to digital representation of an image captured using appropriate image capture device. A video frame typically contains multiple pixel values, with each pixel value representing a point or a small portion of the captured image. A sequence of images are often generated by image capture devices (IMDs) such as a video camera. In general, a user points an IMD to a scene (or area) and captures a sequence of images of the scene. The images can be transmitted externally (e.g., in the case of broadcasting equipment or video conferencing equipment) or stored in an appropriate non-volatile memory.

There is often a need to limit the number of bits used to represent video frames. For example when transmitting the video frames on a transmission path, assuming a certain number of frames need to be transmitted in each time unit, the number of bits used to represent the video frames would be limited by the bandwidth constraint of the transmission path, as is well known in the relevant arts. As such, various processing techniques may be used to minimize the number of data bits that need to be transmitted on the path.

Such number of available bits may need to be further shared to represent different portions of image. For example, H.264 standard described in further detail in a document entitled, "Information technology—Coding of audio-visual objects—Part 10: Advanced Video Coding", available from ISO/IEC (International Standards Organization/International Electrotechnical Commission), contemplates sending a difference of each current frame from a previous frame, while permitting the difference data in different slices (containing a set of macro-blocks, with each macro-block containing multiple pixels) to be encoded at different quantization levels.

Various aspects of present invention provide techniques to allocate an available number of bits to different portions of a video frames.

BRIEF DESCRIPTION OF THE DRAWINGS

Example embodiments will be described with reference to the following accompanying drawings, which are described briefly below.

In the drawings, like reference numbers generally indicate identical, functionally similar, and/or structurally similar elements. The drawing in which an element first appears is indicated by the leftmost digit(s) in the corresponding reference number.

DETAILED DESCRIPTION

Overview

An aspect of the present invention encodes a video frame allocating more bits for a region of interest (ROI) compared to a non-ROI when the video frame is to be encoded using an available number of bits. In an embodiment, the number of bits allocated to encode the ROI is proportionate to a complexity parameter (representing the degree of change of the ROI area in the video frame relative to a reference frame) and a ratio of the ROI to the area of the entire frame. The remaining bits may be allocated to encode the non-ROI of the video frame.

According to another aspect of the present invention, quantization parameters (QP(ROI) and QP(non-ROI)) are computed for the ROI and non-ROI areas. These quantization parameters are used in encoding the respective areas. Only the two parameters are included in the encoded video frame as quantization parameters.

According to yet another aspect of the present invention, the ROI corresponds to facial region in a video frame. Each pixel of the video frame is determined to be skin or non-skin pixel based merely on the chrominance components.

Several aspects of the invention are described below with reference to examples for illustration. It should be understood that numerous specific details, relationships, and methods are set forth to provide a full understanding of the invention. One skilled in the relevant art, however, will readily recognize that the invention can be practiced without one or more of the specific details, or with other methods, etc. In other instances, well-known structures or operations are not shown in detail to avoid obscuring the features of the invention.

DEFINITIONS

The following includes definitions of selected terms used throughout the disclosure. Both singular and plural forms of all terms fall within each meaning:

Scene: A general area sought to be captured in video format

Image: The picture represented by the light captured by an image capture device

Figure 1:
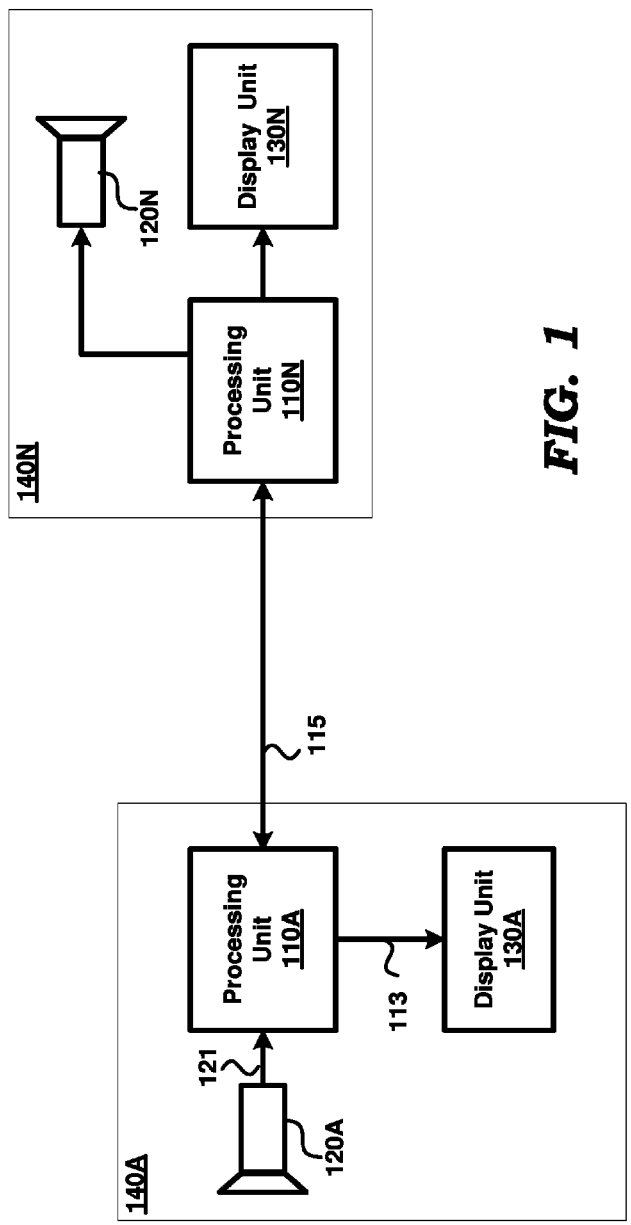
FIG. 1 is a diagram illustrating an example environment in which several features of the present invention may be implemented.

Frame: A set of pixel values representing a captured image viewed as a two dimensional area Pixel: A smallest picture element captured by the image capture device Pixel value: The value representing the brightness and color of a pixel Pixel location: The coordinates of the pixel in the frame Example Environment FIG. 1 is a diagram illustrating an example environment in which several features of the present invention may be implemented. The example environment is shown containing only representative systems for illustration. However, real-world environments may contain many more systems/components as will be apparent to one skilled in the relevant arts. Implementations in such environments are also contemplated to be within the scope and spirit of various aspects of the present invention.

The diagram is shown containing end systems 140A and 140N designed/configured to communicate with each other in a video conferencing application. End system 140A is shown containing processing unit 110A, video camera 120A and display unit 130A, and end system 140N is shown containing processing unit 110N, video camera 120N and display unit 130N. Each component is described in detail below.

Video camera 120A captures images of a scene, and forwards the captured image (in the form of corresponding video frames) to processing unit 110A on path 121. Processing unit 110A may perform various operations (described in detail below) on the video frames received from video camera 120A, and forward the processed video frames on path 115. Path 115 may contain various transmission paths (including networks, point to point lines, etc.), but providing a bandwidth for transmission of the video data.

In an embodiment, processing unit 110A transmits a change in pixel values between consecutive video frames (i.e., previous frame being a reference frame) instead of transmitting the actual pixel values themselves, to minimize the number of bits needed to be transmitted.

In particular, processing unit 110A operates to allocate an available number of bits to represent changes (in relation to a reference frame, according to a convention) in pixel values in different portions of a video frame based on the bandwidth of path 115. Processing unit 110A may also receive video data from other systems (not shown), and forward the video data to display unit 130A on path 113 for display.

Processing unit 110N, video camera 120N and display unit 130N respectively operate similar to the corresponding components of end system 140A, and the description is not repeated for conciseness. End systems 140A through 140N represent example systems implemented according to several aspects of the present invention.

It may be appreciated that a video frame may contain different portions, each portion having a corresponding level of significance, at least in terms of the desired video information they represent. The portion(s) that contains such desired video information are termed as region of interest.

Processing unit 110A implemented according to an aspect of the present invention recognizes such a possibility, and allocates an available number of bits to different portions in a frame in such a way that the more significant portions are represented using more number of bits, while the less significant portions are represented by fewer number of bits as described below with examples.

Allocating Bits to Different Portions of a Video Frame

Figure 2:
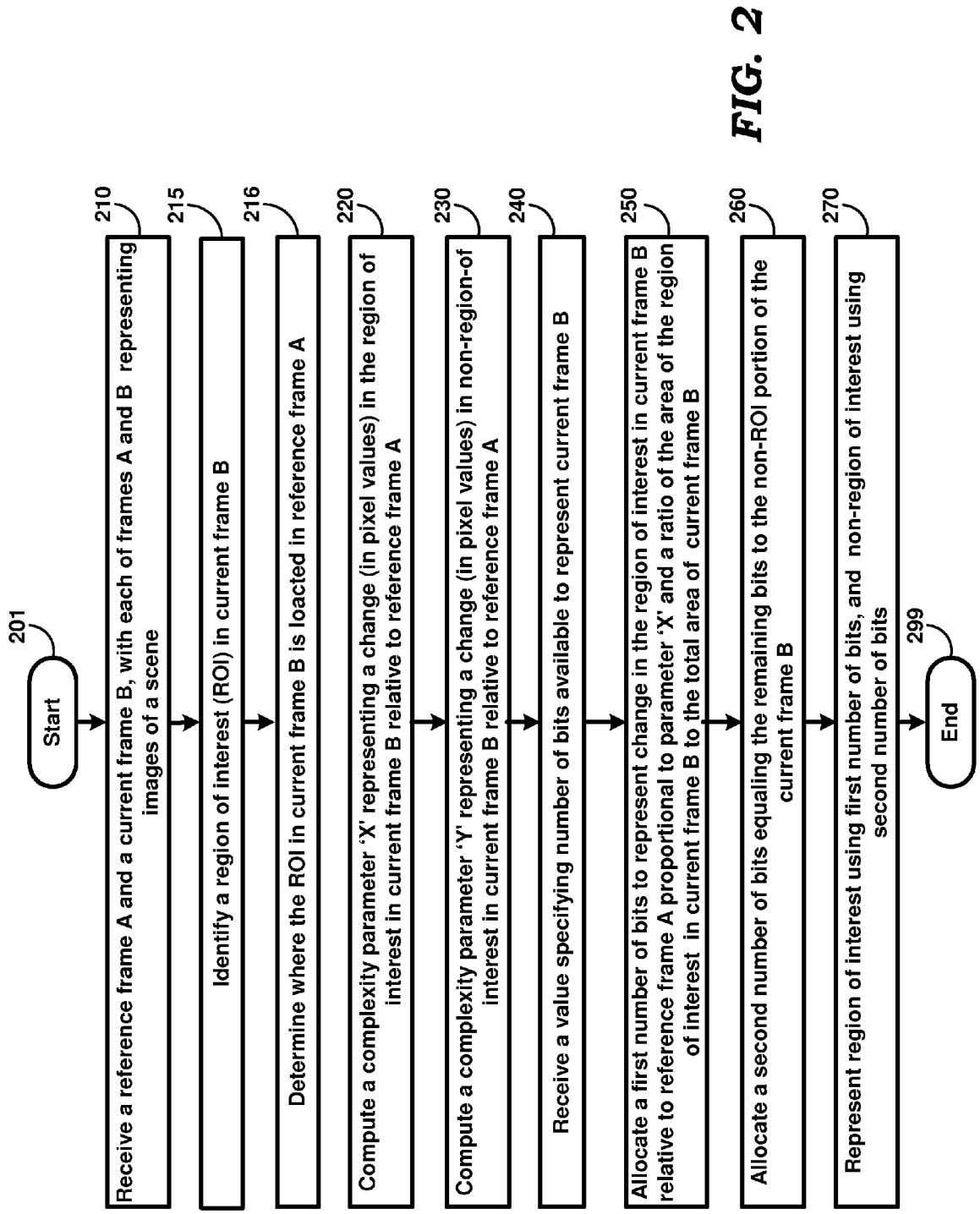
FIG. 2 is a flowchart illustrating the manner in which bits are allocated to different portions of a video frame in one embodiment.

FIG. 2 is a flowchart illustrating the manner in which bits are allocated to different portions of a video frame. The flowchart is described with respect to FIG. 1, and in relation to processing unit 110A, merely for illustration. However, various features can be implemented in other environments and other components. Furthermore, the steps are described in a specific sequence merely for illustration. Also, while in the embodiment described below, two portions (corresponding to face and non-face), are used, various other techniques of partitioning video frames into more portions may be used.

Alternative embodiments in other environments, using other components, and different sequence of steps can also be implemented without departing from the scope and spirit of several aspects of the present invention, as will be apparent to one skilled in the relevant arts by reading the disclosure provided herein. The flowchart starts in step 201, in which control passes immediately to step 210.

In step 210, processing unit 110A receives a reference frame A and a current frame B, with each of frames A and B representing images of a scene, and current frame B having been generating at a time instance later than reference frame A. In an embodiment, frames A and B represent successive image frames. Control then passes to step 215.

In step 215, processing unit 110A identifies a region of interest in current frame B. In an embodiment, the region of interest (ROI) corresponds to facial regions, and the manner in which a facial region is identified is described in sections below. Control then passes to step 216.

In step 216, processing unit 110A determines where the ROI in current frame B is located in reference frame A. In an embodiment described below, processing unit 110A performs a matching process to make such a determination. Control then passes to step 220.

In step 220, processing unit 110A computes a complexity parameter 'X' for ROI in current frame B, with the complexity parameter 'X' representing a change in the video information (for example, in terms of pixel values) in the ROI between frames A and B. In an embodiment described below, complexity parameter 'X' is computed as a sum-of-absolute-differences between corresponding pixel values in corresponding macro-blocks in frames A and B. However other formulas can be used to represent the complexity. Control then passes to step 230.

In step 230, processing unit 110A computes a complexity parameter 'Y' representing a change (in pixel values) between frames A and B in a non-region of interest (non-ROI). In the embodiment described below, the second portion corresponds to non-facial region. Control then passes to step 240.

In step 240, processing unit 110A receives a value specifying a number of bits available to represent current frame B. The value generally depends on the bandwidth of path 115 and the number of frames sought to be transmitted in a unit time. Control then passes to step 250.

In step 250, processing unit 110A allocates a first number of bits to represent the first portion of the image in current frame B proportional (i.e., having a positive correlation) to each of parameter 'X' and a ratio of the area of ROI in current frame B to the total area of current frame B. Control then passes to step 260.

In step 260, processing unit 110A allocates a second number of bits, equaling the rest of the available bits, to represent non-ROI. Control then passes to step 270. In step 270, processing unit 110A represents the ROI in current frame B using the first number of bits, and non-ROI using the second number of bits. The bit stream representing the encoded frame is generated using (by including) the two groups of bits. Control then passes to step 299, in which the flowchart ends.

The features described above can be implemented in various environments and with different implementations. In one embodiment, the data is transmitted on path 115 consistent with the H.264 standard noted above. The internal details of an embodiment of processing unit 110A in such an environment are described next.

Processing Unit

Figure 3:
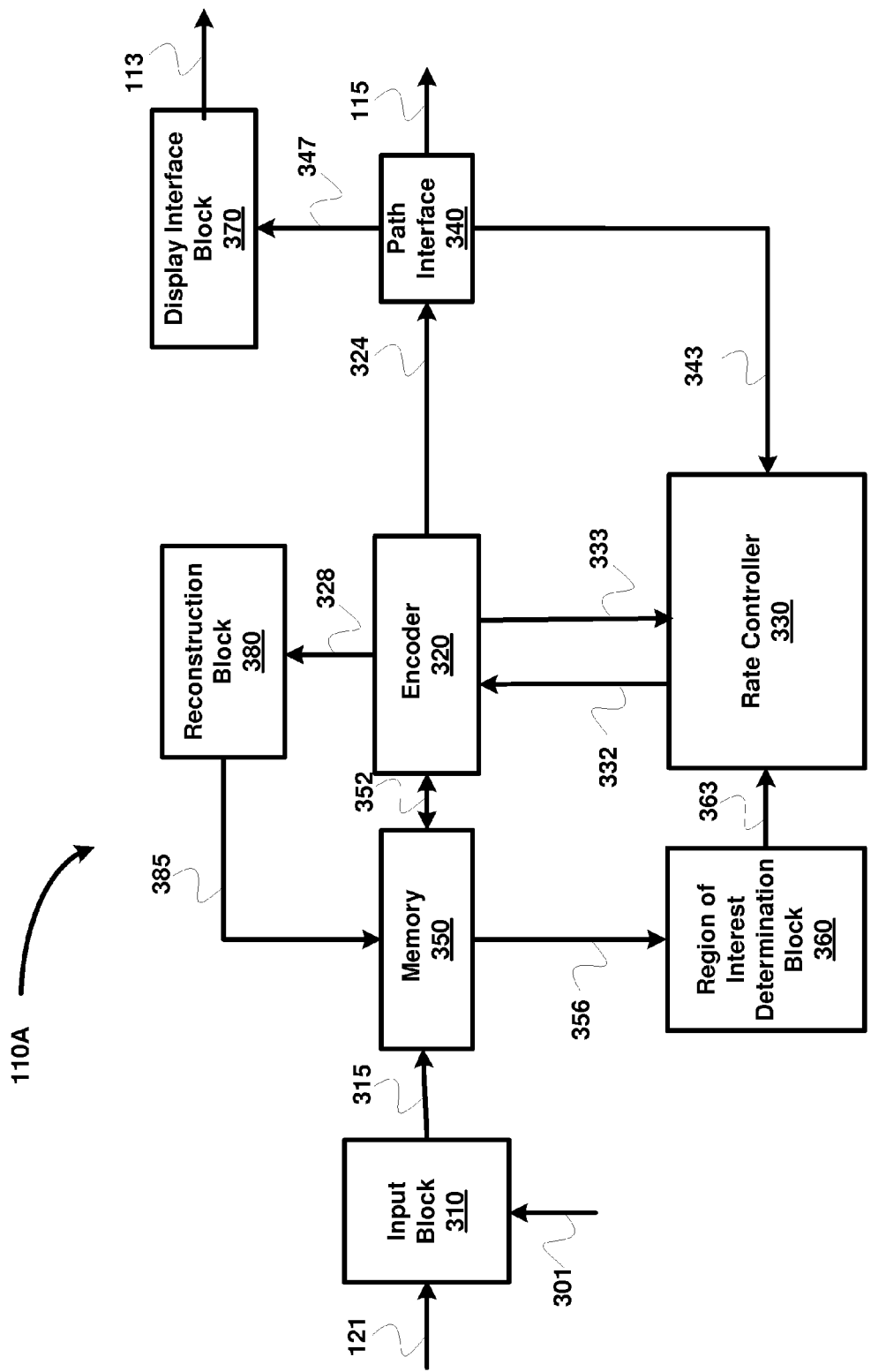
FIG. 3 is a block diagram illustrating the internal details of a processing unit operating to allocate bits to different portions of a video frame in one embodiment.

FIG. 3 is a block diagram illustrating the internal details of processing unit 110A in one embodiment. The diagram is shown containing input block 310, encoder 320, rate controller 330, path interface 340, memory 350, region-of-interest (ROI) determination block 360, display interface block 370, and reconstruction block 380. Processing unit 110A may also contain other blocks internally, but are not shown as not being relevant to an understanding of the description to follow. Each component is described in detail below.

Input block 310 enables processing unit 110A to receive video frames (in the form of pixel values) from a video camera (e.g. video camera 120A) connected on path 121. As described in the H.264 standard in further detail, each frame is viewed as containing multiple macro-blocks, with each macro-block containing pixels of a square region (e.g., 16×16 in the H.264 standard, etc.). However, the macro-blocks can be of other shapes/sizes. Input block 310 also enables a user to provide any necessary inputs (path 301) to processing unit 110A.

Path interface 340 may enable processing unit 110A to send/receive video frames to/from other end systems (including end system 140N) via path 115 using protocols such as internet protocol (IP). In particular, path interface 340 receives a bit-stream consistent with the H.264 standard representing an encoded video frame from encoder 320 via path 324, and transmits the bit-stream via path 115.

Memory 350 may be used to store video frames received from video camera 120A via input block 310 and path 315. Memory 350 may be implemented as a volatile or non-volatile memory.

Display interface block 370 provides output signals (e.g., display signals) on path 113 to display unit 130A, for display of video frames received from other end systems via path interface 340 and path 347. Input block 310, path interface 340, memory 350 and display interface block 370 can be implemented in a known way.

Reconstruction block 380 receives a representation of a current video frame from encoder 320 on path 328, and operates to reconstruct the video frame from the representation. Reconstruction can be implemented in a known way, for example, as described in the H.264 standard. Reconstruction block 380 stores the reconstructed frame in memory 350 via path 385.

ROI determination block 360 retrieves a current (to be transmitted) video frame from memory 350 via path 356, and identifies a region of interest within the frame. ROI determination block then forwards the location of the region of interest within the frame to rate controller 330 via path 363. In an embodiment described below, ROI determination block 360 indicates to rate controller 330 which macro-blocks in a current frame to be encoded represent the ROI (to be hereafter called 'ROI macro-blocks'), and which do not (hereafter called 'non-ROI macro-blocks'). In an embodiment, ROI determination block operates on a sub-sampled version of the current video frame to determine the ROI. However, the ROI can be determined by examining the source frame (without subsampling) itself in alternative embodiments.

Encoder 320 retrieves a video frame from memory 350 (via path 352) and operates to encode the video frame. In an embodiment described in sections below in greater detail, encoder 320 computes the complexity parameter for the entire frame, and provides the complexity parameter for the entire frame as well as each macro-block in the frame, as also a quantization parameter representing the number of bits that can be used to represent each pixel (or corresponding change in relation to the reference frame) to rate controller 330 via path 333.

Encoder 320 then receives data from rate controller 330 indicating the quantization parameters to be used respectively to encode (macro-blocks in) ROI portions and non-ROI portions of the current video frame. Encoder 320 encodes the ROI and non-ROI portions using the corresponding number of bits and forwards the encoded bit-stream to path interface 340 via path 324.

Encoder 320 and reconstruction block 380 may be implemented consistent with the H.264 standard (including the decoding approaches described in the standard).

Rate controller 330 receives bandwidth information (indicating an available number of bits to represent a video frame) of path 115 from path interface 340 (e.g., based on user configuration) via path 343, and the identities (for example, in the form of location co-ordinates or macro-block number) of 'ROI macro-blocks' and 'non-ROI macro-blocks' from ROI determination block 360. Rate controller 330 also receives complexity parameters, and quantization parameter to represent the entire frame from encoder 320. The bandwidth information is passed to encoder 320 via path 332.

Based on the inputs received, rate controller 330 operates to compute the quantization parameters for the ROI and non-ROI macro-blocks, thereby allocating the available number of bits to the ROI and non-ROI portions of the current frame. The manner in which rate controller 330 performs such allocation is described in detail in sections below. As rate controller 330 receives some values prior to allocating the available bits to different portions of a video frame, the description of the internal units of encoder 320 in an embodiment is provided next.

Encoder

Figure 4:
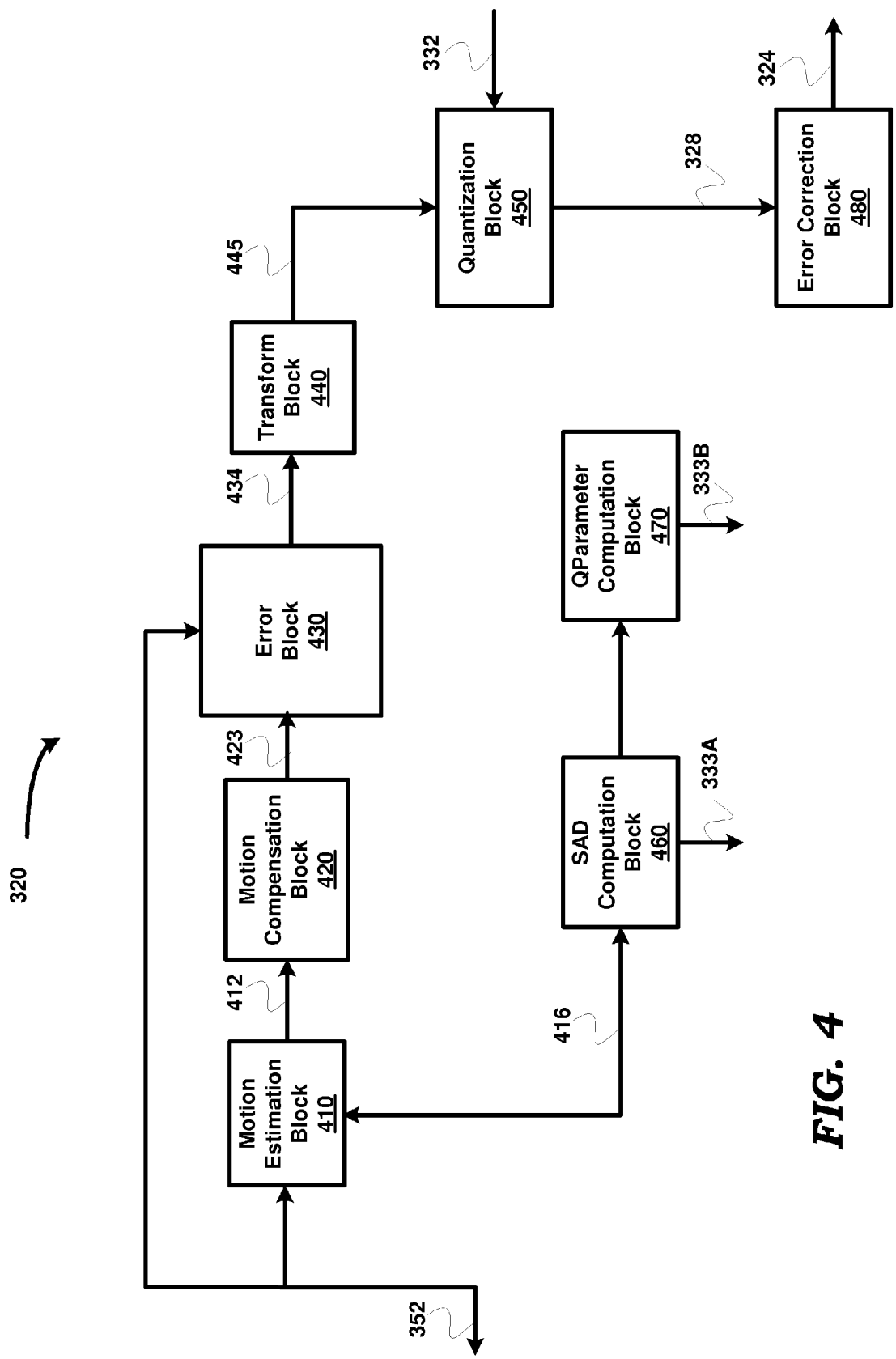
FIG. 4 is a block diagram illustrating the internal details of an encoder in an embodiment.

FIG. 4 is a block diagram illustrating the internal details of encoder 320 in an embodiment. The diagram is shown containing motion estimation (ME) block 410, motion compensation (MC) block 420, error block 430, transform block 440, quantization block 450, SAD computation block 460, Qparameter computation block 470 and error correction block 480. All components shown may be implemented consistent with the H.264 standard. Each component is described below in detail.

ME block 410 retrieves a current frame (to be encoded) and a reference frame from memory 350 (FIG. 3) via path 352. ME block 410 divides the current frame into macro-blocks, and for each macro-block in the current frame, ME block 410 performs a matching process with respect to the reference frame to determine a corresponding location (macro-block) in the reference frame which is most similar (i.e., has maximum correlation).

In an embodiment, ME block 410 provides a pair of macro-blocks (one in the current frame and the other in the reference frame) to SAD computation block 460 via path 416, and receives a corresponding SAD value (described below) signifying how close the match between the two macro-blocks is. ME block 410 repeats the above process till a macro-block pair (referred to hereafter as matching macro-block pair) is found for which the value of SAD is a minimum. The minimum SAD represents the complexity parameter for the macro block of the current frame.

In a similar manner, ME block 410 determines matching macro-block pairs for the whole of the current frame, and determines for each pair a motion vector specifying the relative displacement of the macro-blocks between the current frame and the reference frame. ME block 410 forwards the macro-blocks in the reference frame and the motion vectors to MC block 420 for further processing.

SAD computation block 460 receives a pair of macro-blocks (one from the current frame and the other from the reference frame) from ME block 410, and computes a sum-of-absolute-differences (SAD) between corresponding pixel values in the macro-blocks. SAD computation block 460 provides the computed SAD value to ME block 410. SAD computation block 460 also receives indication of matching macro-block pairs from ME block 410, and forwards the corresponding SAD values to rate controller 330 (via path 333A), and to Qparameter computation block 470.

SAD computation block 460 may compute the SAD values according to the following equation:

$$SAD = \sum_{i=1}^{N} abs[A(i) - B(i)] \quad \text{Equation 1a}$$

wherein,
SAD is the sum-of-absolute-differences.
Σ is the summation operator
N is the total number of pixels in a macro-block
'abs' is an absolute value operator
A(i) is the value of the ith pixel in a macro-block "A"
B(i) is the value of the ith pixel in a macro-block "B"

QParameter computation block 470 computes a quantization parameter QP (frame) to be applied to represent the current frame as a whole. Such computation may be performed according to the specification of the H.264 standard. The value for QP (frame) is computed consistent with the total number of available bits (i.e., the bandwidth of line 115 in FIG. 1). QParameter computation block 470 forwards QP(frame) to rate controller 330 via path 333B.

MC block 420 generates a 'predicted' version of the current frame from the macro-blocks of the reference frame and the motion vectors received from ME block 410. The predicted version of the current frame represents a 'motion-compensated' current frame with respect to the reference frame. MC block 420 forwards the predicted version of the current frame to error block 430.

Error block 430 computes a difference ('error') between the pixel values in macro-blocks of the predicted version of the current frame and the current frame (received directly via path 352). The difference values so computed are an encoded representation of the current frame, and are forwarded by error block 430 to transform block 440 via path 434.

Transform block 440 performs a transform (according to the specifications of H.264 standard) of the difference values received from error block 430, and forwards the transform coefficients to quantization block 450 via path 445.

Quantization block 450 receives two quantization parameters (QP(ROI) for the ROI macro-blocks and QP(non-ROI) for non-ROI macro-blocks) from rate controller 330 via path 332 (as noted above), and operates to assign QP(ROI) to represent the transform coefficients pertaining to ROI macro-blocks and QP(non-ROI) to represent the transform coefficients pertaining to non-ROI macro-blocks.

Thus, ROI macro-block coefficients may be represented using lower quantization parameters (i.e., more quantization levels/more number of bits), while non-ROI macro-block coefficients may be represented using larger quantization parameters (i.e., fewer quantization levels/lesser number of bits). Quantization block 450 forwards the bits as well as QP(ROI) and QP(non-ROI) to error correction block 480 via path 328.

Error correction block 480 may perform error-correction coding (adding redundant bits to overcome errors while transmitting on the network) to the bits received, and forward the bits to path interface 340 (FIG. 3) via path 324. The final bit stream provided on path 324 may be formatted/packetized consistent with the H.264 standard.

The manner in which different number of bits are allocated for the ROI and non-ROI macro-blocks is described next in detail.

Allocation of Bits

FIGS. 5A, 5B, 5C and 5D are example diagrams used to illustrate the manner in which processing unit 110A allocates an available number of bits to represent different portions of a video frame. Although the following description is made with respect to FIGS. 1, 2 and 3, and in relation to the components of processing unit 110A for the purpose of illustration, the techniques described can be implemented in other environments and with other components as well. Merely for illustration, the following description is made with respect to a current frame B (shown in FIG. 5A) and a reference frame A (shown in FIG. 5B) wherein in each figure rectangles in black represent macro-blocks in the ROI.

Further, although macro-blocks are shown to be all of the same size in the figures consistent with the H.264 specification, macro-blocks of varying sizes may be used (in other environments), based on factors such as the amount of video information in a particular area of the frame, etc. For example, when the video information in a particular macro-block is more detailed, the macro-block may be further divided into smaller macro-blocks, so that the details may be represented with greater accuracy during processing.

Figure 5B:
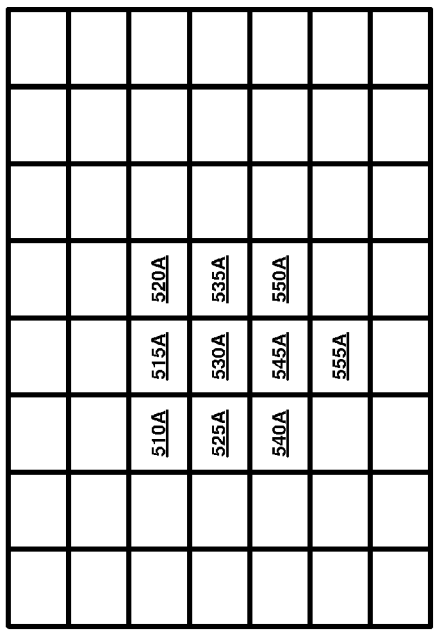
FIGS. 5A, 5B, 5C and 5D are example diagrams used to illustrate the manner in which an available number of bits are allocated to represent different portions of a video frame in one embodiment.
Figure 5A:
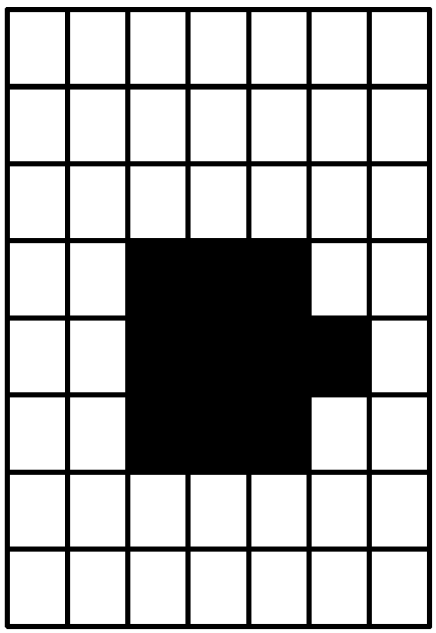
Figure 5D:
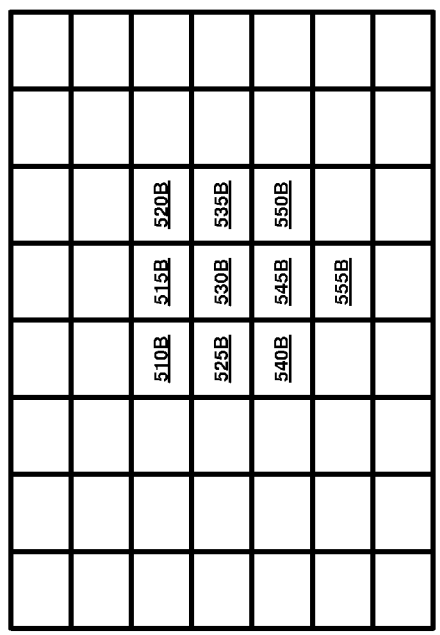
Figure 5C:
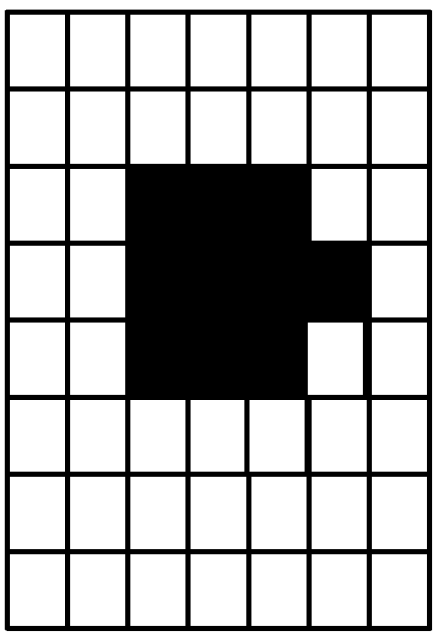

As noted above, ROI determination block 360 retrieves a current frame B from memory 350, and determines which macro-blocks represent the region of interest (ROI—shown as black squares in FIG. 5A). In FIG. 5C 'ROI macro-blocks' of FIG. 5A are shown numbered 510B, 515B, 520B, 525B, 530B, 535B, 540B, 545B, 550B and 555B, while all other (non-numbered) macro-blocks are 'non-ROI macro-blocks'.

In an embodiment, ROI determination block 360 performs a 'smoothening' operation to reduce the amount of video information (represented by high frequency variations in pixel values) in the non-ROI macro-blocks. The pixel values in each non-ROI macro-block may, for example, be filtered using a 3×3 averaging filter with an impulse response such as given by the following equation:

$$h(i, j) = \frac{1}{9}\begin{bmatrix} 1 & 1 & 1 \\ 1 & 1 & 1 \\ 1 & 1 & 1 \end{bmatrix} \quad \text{Equation 1b}$$

h(i,j) is the impulse response of the filter

[ ] represents a 3×3 matrix with entries as shown

ME block 410 retrieves current frame B (FIG. 5A or 5C), and for each macro-block, performs a matching process with respect to reference frame A as noted above. ME block 410 may determine a match as shown in FIG. 5D, in which it is assumed that 'ROI macro-blocks' 510B, 515B, 520B, 525B, 530B, 535B, 540B, 545B, 550B and 555B of current frame B have a maximum correlation with macro-blocks 510A, 515A, 520A, 525A, 530A, 535A, 540A, 545A, 550A and 555A respectively of reference frame A.

Although not indicated in the figures, ME block 410 also determines for each 'non-ROI macro-block' in current frame B a corresponding matching macro-block in reference frame A. As noted above, rate controller 330 receives data from ROI determination block 360 indicating which macro-blocks in current frame B are ROI macro-blocks, and which are non-ROI macro-blocks, as also SAD values for matching macro-block pairs and SAD value for the entire current frame B from SAD computation block 460. Rate controller 330 may then determine a SAD value for the ROI and non-ROI portions as a whole by adding the corresponding SAD values, as given by the following equations:

$$SAD(ROI) = \Sigma(SAD \text{ for } ROI \text{ macro blocks}) \quad \text{Equation 2A}$$

$$SAD(\text{Non-}ROI) = SAD(\text{Frame}) - SAD(ROI) \quad \text{Equation 2B}$$

Wherein,

Σ is the summation operator

SAD(ROI) is the SAD value for the ROI as a whole

SAD(non-ROI) is the SAD value for the non-ROI as a whole

SAD(frame) is the SAD value for the entire frame

It may be appreciated that SAD(ROI) is a complexity parameter ('X' in flowchart of FIG. 2) representing how complex the change in video information is for the ROI portions. Similarly, SAD(non-ROI) is a complexity parameter ('Y' in flowchart of FIG. 2) representing how complex the change in video information is for the non-ROI portions.

Rate controller 330 then computes a parameter 'QPPReferencefactor' given by the following equation:

$$QPP\text{Referencefactor} = 4[N(ROI) - N(\text{Frame})]/N(\text{frame}) \quad \text{Equation 3A}$$

i.e., $QPP\text{Referencefactor} = -4 \cdot N(\text{non-}ROI)/N(\text{frame}) \quad \text{Equation 3B}$ wherein, N(ROI) is the number of macro-blocks in the ROI in current frame B N(non-ROI) is the number of macro-blocks in the non-ROI in current frame B N(frame) is the sum of N(ROI) and N(non-ROI), and is the total number of macro-blocks in frame B.

Rate controller 330 then computes a temporary value for the quantization parameter according to the following formula:

$$QP\text{temp}(ROI) = QP(\text{frame}) + QPP\text{Referencefactor} \quad \text{Equation 4}$$

wherein,

QPtemp(ROI) is a temporary value for the quantization parameter for pixel value differences in the ROI QP(frame) is the quantization parameter for the entire frame, and computed as described in section 8.555 of the H.264 standard 'QPPReferencefactor' is as given by equation 3.

Rate controller 330 computes QP(ROI) by limiting the value of Qptemp(ROI) in current frame B obtained from equation 4 according to the equation below:

$$QP(ROI) = \text{MAX}(\text{MIN}QP, QP\text{temp}(ROI)) \quad \text{Equation 5}$$

wherein,

MINQP is the minimum value of quantization parameter that can be used to achieve a desired bit-rate (bandwidth of path 115)

QPtemp(ROI) is obtained from equation 4

MAX is the maximum-value operator. In equation 5, the MAX operation provides the greater of the values MINQP and QP(ROI)

Having thus obtained the values for QP(ROI) and QP(frame) for current frame B, rate controller 330 computes the corresponding quantization step sizes Qstep(ROI) and Qstep(frame) as specified by the H.264 standard and the H.264 reference encoder according to the Table reproduced below:

| | QP | | | | | | | | | | | | |
|---|---|---|---|---|---|---|---|---|---|---|---|---|---|
| | 0 | 1 | 2 | 3 | 4 | 5 | 6 | 7 | 8 | 9 | 10 | 11 | 12 ... |
| QStep | 0.625 | 0.6875 | 0.8125 | 0.875 | 1 | 1.125 | 1.25 | 1.375 | 1.625 | 1.75 | 1 | 2.85 | 2.5 ... |

| | QP | | | | | | |
|---|---|---|---|---|---|---|---|
| | ... 18 | ... 24 | ... 30 | ... 36 | ... 42 | ... 48 | ... 51 |
| QStep | 5 | 10 | 20 | 40 | 80 | 160 | 224 |

As an example, if QP(ROI) obtained from equation 5 has a value 2, then processing unit 110A sets Qstep(ROI) as 0.8125.

Rate controller 330 then computes the quantization step size Qstep(non-ROI) for the non-ROI in current frame B according to the following equation:

$$Q\text{step}(\text{non-}ROI) = [SAD(\text{non-}ROI) \cdot Q\text{step}(\text{frame}) \cdot Q\text{step}(ROI)]/[\{SAD(\text{frame}) \cdot Q\text{step}(ROI)\} - \{SAD(ROI) \cdot Q\text{step}(\text{frame})\}] \quad \text{Equation 6}$$

wherein, Qstep(frame) is the quantization step size for the entire frame, and is obtained by looking up in the table above with the value of QP(frame) as an input.

From the value of Qstep(non-ROI) thus computed, rate controller 330 obtains a corresponding value of quantization parameter QPtemp1 (non-ROI) for the non-ROI in current frame B from the table shown above. As an example, if Qstep(non-ROI) obtained from equation 6 has a value 2.25, then processing unit 110A sets QPtemp1 (non-ROI) as 11.

Rate controller 330 may limit the value of QPtemp1 (non-ROI) thus obtained according to the equation below:

$$QPtemp2(non\text{-}ROI) = MAX(QP(frame)+2, QPtemp1(non\text{-}ROI)) \quad \text{Equation 7}$$

wherein,

QP(frame) is obtained as noted above

QPtemp1 (non-ROI) on the right-hand side of equation 4 is obtained as noted above MAX is the maximum-value operator.

In equation 7, the MAX operation provides the greater of the values QP(frame)+2 and QP(non-ROI)

Rate controller 330 may further limit the value of QPtemp2 (non-ROI) according to the equation below to obtain the value of QP(non-ROI):

$$QP(non\text{-}ROI) = MIN(MAXQP, QPtemp2(non\text{-}ROI)) \quad \text{Equation 8}$$

Rate controller 330 provides the values of QP(ROI) and QP(non-ROI) obtained above to quantization block 450 via path 332.

It may be seen from equations 3 and 4 that QP(ROI) is proportional (linearly dependent upon) to the ratio of the number of macro-blocks representing the ROI and the total number of macro-blocks in the frame, or in general, proportional to the ratio of the area of the ROI in current frame B to the area of current frame B.

In particular, it may be seen from equation 3, that when the ROI is very large, the value of QPPReferencefactor becomes a very small negative number. Consequently, the value of QP(ROI) approaches the value of QP(frame). In other words, almost all the available number of bits may be allocated to the ROI.

Further, re-arranging equation 6 provides:

$$SAD(frame)/Qstep(frame) = SAD(ROI)/Qstep(ROI) + SAD(non\text{-}ROI)/Qstep(non\text{-}ROI) \quad \text{Equation 9}$$

It may be seen that Qstep(ROI), and thus QP(ROI) is also proportional (has a positive correlation) with SAD(ROI). In other words, the quantization parameter, and hence the number of bits used to represent the ROI is also proportional to the complexity(e.g., in terms of detail) of the information change.

Therefore, QP(ROI) may be seen as proportional to both the ratio of the area of the ROI portion to the area of the current frame itself, and also the complexity represented by SAD(ROI).

It may also be observed from equation 9 that QP(non-ROI) is proportional to SAD (non-ROI).

Further, it may be appreciated that since only two quantization parameters are used, viz., QP(ROI) for the ROI and QP(non-ROI) for the non-ROI, processing unit 110A needs to transmit only these two parameters to the destination end (end system 140N), further reducing the number of bits needed to be transmitted. As a comparison, assuming current frame B is not divided into ROI and non-ROI and processed as described above, processing unit 110A might have to compute (potentially different) quantization parameter values for each macro-block and transmit each of the values(or at least a delta value representing differences between the quantization parameter values), which would require more number of bits.

Thus, processing unit 110A operates to allocate an available number of bits (as represented by the bandwidth of path 115 to ROI and non-ROI portions of a video frame. As noted above, in an embodiment the ROI is a facial region (with the non-ROI being non-facial regions). Facial region ('face') is determined by first determining whether a pixel of an image corresponds to skin or not. The manner in which pixels corresponding to skin can be identified is described below in further detail.

8. Identifying Pixels Representing Skin

Figure 6:
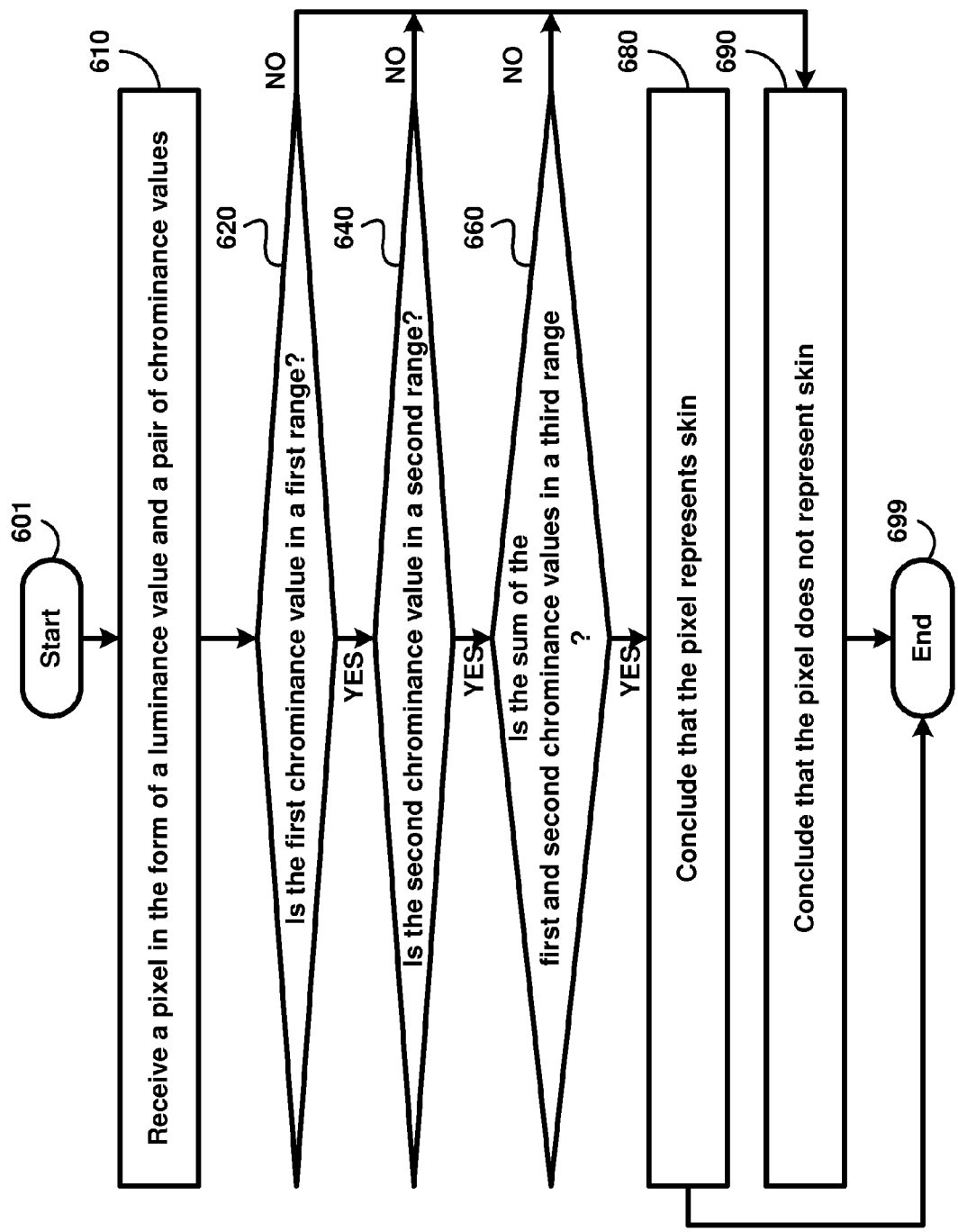
FIG. 6 is a flowchart illustrating the manner in which skin pixels are identified in one embodiment.

FIG. 6 is a flowchart illustrating the manner in which ROI determination block 360 identifies pixels representing skin in one embodiment. Again, the flowchart is described with respect to FIGS. 2 and 3, and in relation to the components of processing unit 110A, merely for illustration. However, various features can be implemented in other environments and other components. Furthermore, the steps are described in a specific sequence merely for illustration. Various alternative embodiments in other environments, using other components, and different sequence of steps can also be implemented without departing from the scope and spirit of several aspects of the present invention, as will be apparent to one skilled in the relevant arts by reading the disclosure provided herein. The flowchart starts in step 601, in which control passes immediately to step 610.

In step 610, ROI determination block 360 receives a pixel in the form of a luminance value and a pair of chrominance values. In an embodiment, the luminance and chrominance values correspond to the respective values in a YCbCr color space representation (Y corresponding to the luminance value, Cb and Cr corresponding to the pair of chrominance values). ROI determination block 360 may receive the pixel value in YCbCr form from memory 350, or may internally perform color space conversion of pixel value received in an alternative form (for example, RGB). Control then passes to step 620.

In step 620, ROI determination block 360 determines whether the first chrominance value (Cb) lies in a first range of values. Control passes to step 640 if the value is in the range, else control passes to step 690. In an embodiment the first range corresponds to a range of values between 67 and 123 (both inclusive).

In step 640, ROI determination block 360 determines whether the second chrominance value (Cr) lies in a second range of values. Control passes to step 660 if the value is in the range, else control passes to step 690. In an embodiment the second range corresponds to a range of values between 136 and 175 (both inclusive).

In step 660, ROI determination block 360 determines whether the sum of the first chrominance value (Cb) and the second chrominance value (Cr) lies in a third range of value. Control passes to step 680 if the value is in the range, else control passes to step 690. In an embodiment the third range corresponds to a range of values between 220 and 275 (both inclusive).

In step 680, ROI determination block 360 concludes that the pixel represents skin. Control then passes to step 699, in which the flowchart ends. In step 690, ROI determination block 360 concludes that the pixel does not represent skin. Control then passes to step 699, in which the flowchart ends.

It should be appreciated that the above approach and ranges have been determined based on various experiments and observations. The approach facilitates identifying pixels representing skin with minimal computations (one addition and three comparisons), which facilitates the determination to be performed with minimal processing resources.

It should also be appreciated that approach can be extended to potentially several other objects with appropriate changes to the ranges, as will be apparent to one skilled in the relevant arts by reading the disclosure provided herein.

In one embodiment, to facilitate further processing as regards determination of a ROI, for each pixel in a set of pixels corresponding to an image, ROI determination block 360 determines whether the pixel represents skin or not in a manner illustrated above, and generates a corresponding 'skin map' of the image. The skin map can be in the form of an array equaling the dimensions of an image sensor array contained within video camera 120A (not shown) and/or the dimensions of a video frame, with each bit of the map indicating whether the output of the corresponding sensor element represents skin or not (as a binary value).

Alternatively, each point in the skin map can represent a macroblock such that the skin map would have the dimensions of number of macroblocks in each row by the number of macroblocks in each column. In such a scenario, each block may be considered to represent skin if the number of pixels in the macroblock exceeds a pre-specified threshold. The skin map may be generated for each frame.

ROI determination block 360 may then operate on the skin map as an input, to identify a facial region (an example of a region of interest in one embodiment), as described in detail below. First, the skin map is pre-processed to add additional pixels in a skin map as representing skin and to remove some pixels from being considered skin based on a recognition that points adjacent to skin are likely to be skin and points that are not adjacent to skin are unlikely to be skin.

9. Pre-Processing of Skin Map

Figure 7A:
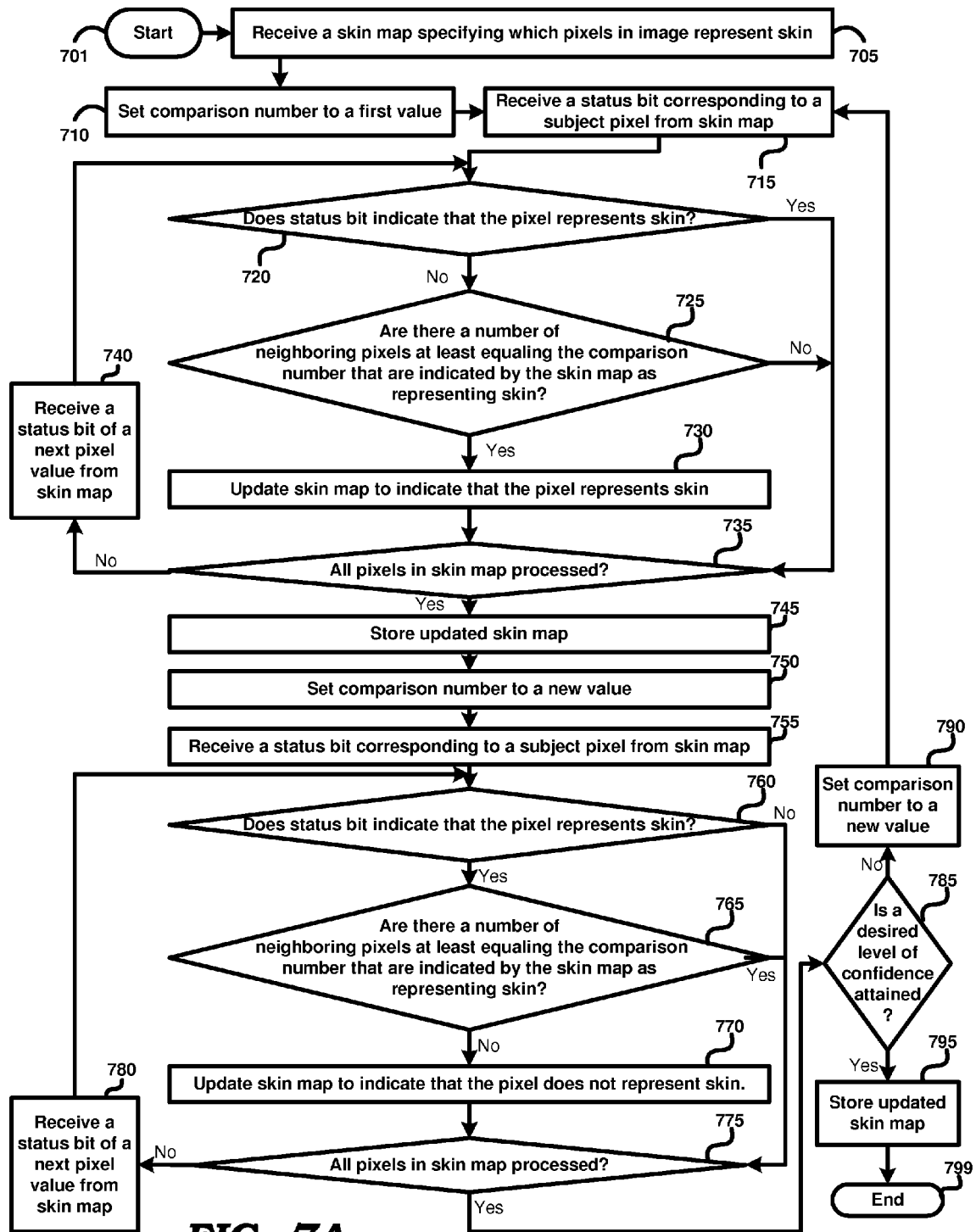
FIGS. 7A, 7B and 8A are flowcharts illustrating the manner in the which a skin map may be pre-processed prior to determining regions forming a face in one embodiment.
Figure 7B:
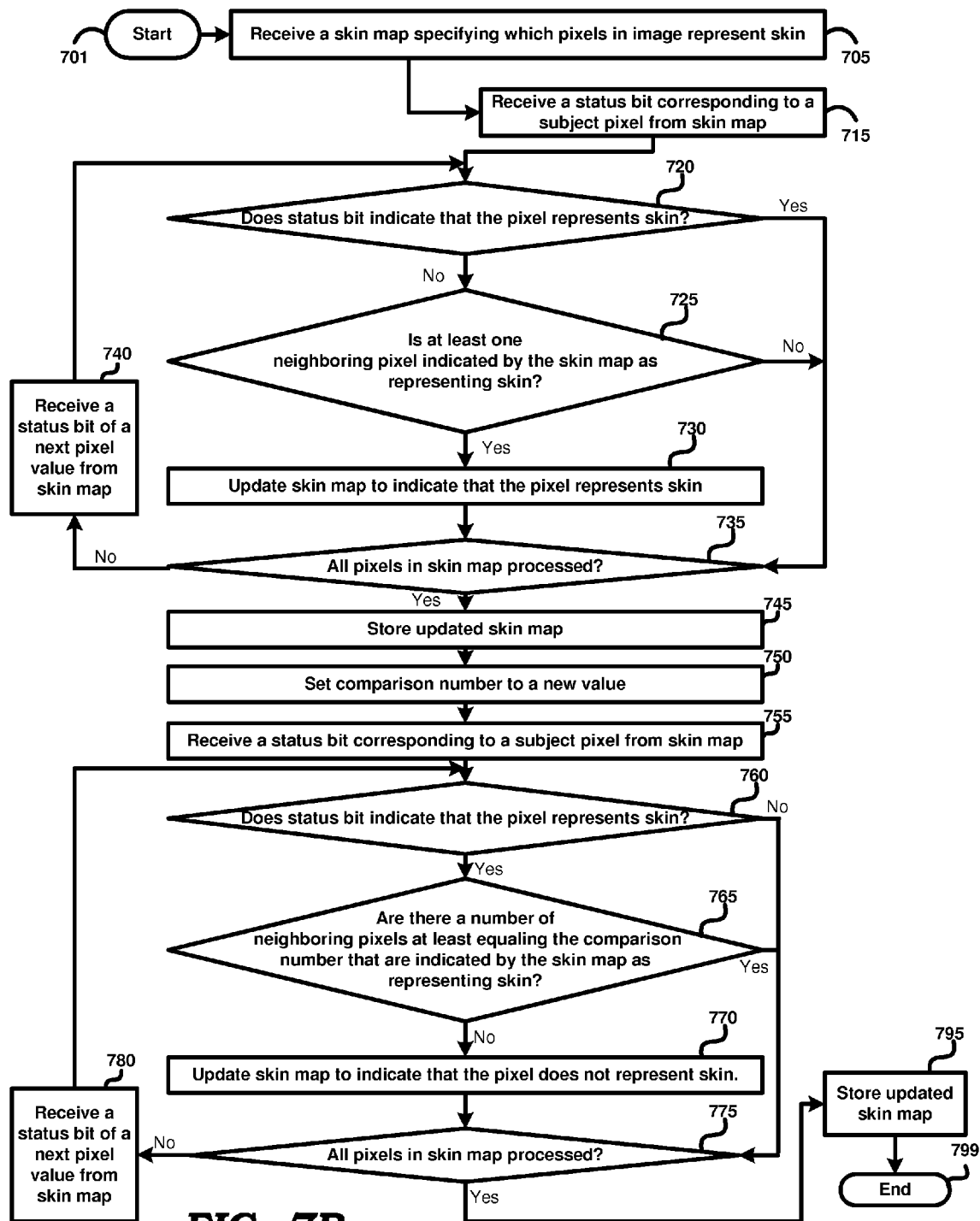
Figure 8A:
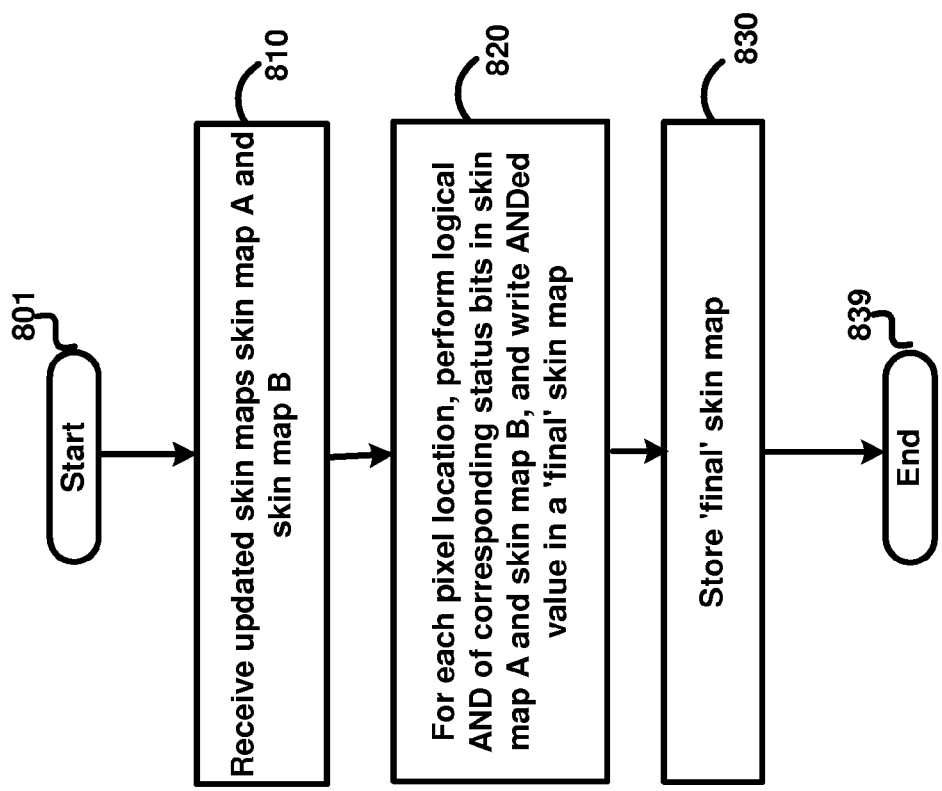

FIGS. 7A, 7B and 8A are flowcharts illustrating the manner in the which skin map may be pre-processed prior to determining regions forming a face in one embodiment. Again, the flowchart is described with respect to FIGS. 2 and 3, and in relation to ROI determination block 360, merely for illustration. However, various features can be implemented in other environments and other components.

Furthermore, the steps are described in a specific sequence merely for illustration. Various alternative embodiments in other environments, using other components, and different sequence of steps can also be implemented without departing from the scope and spirit of several aspects of the present invention, as will be apparent to one skilled in the relevant arts by reading the disclosure provided herein. The flowchart of FIG. 7A starts in step 701, in which control passes immediately to step 705.

In step 705, ROI determination block 360 receives a (source) skin map specifying which pixels in the image represent skin. The skin map be generated, for example, by ROI determination block 360 as described above with respect to the flowchart of FIG. 5. Control then passes to step 710.

In step 710, ROI determination block 360 sets a comparison number to a first value. As will be apparent from the description below, the comparison number indicates the number of neighboring pixels representing skin to be present before a subject pixel is also deemed to represent skin. Control then passes to step 715.

In step 715, ROI determination block 360 receives a status bit corresponding to a pixel (as a subject pixel) from the skin map received in step 705. In an embodiment, the status bit is received as a binary value, wherein a binary 1 (0) specifies that the (first) pixel has been identified as representing skin, and a binary 0 (1) specifies otherwise. Control then passes to step 720.

In step 720, if the status bit indicates that the pixel represents skin, control passes to step 735, else control passes to step 725.

In step 725, ROI determination block 360 determines from the skin map the number of pixels neighboring (immediately adjacent to) the subject pixel that also represent skin. Control passes to step 730 if ROI determination block 360 determines (from the corresponding values in the skin map) that the number of neighboring pixels representing skin is equal to or greater than the comparison number, else control passes to step 735.

It must be noted that the operation of this step may be performed at a macro-block level (group of pixels, e.g. 3×3 pixel block) instead of at the pixel level described above, i.e., if a predetermined number of macro-blocks surrounding a current (subject) macroblock are marked as skin type then the current macroblock is also marked as skin-type macroblock. Each macroblock may initially be marked as skin type of at least a pre-specified number of pixels within the macroblock are indicated to represent skin in the source skin map.

In step 730, ROI determination block 360 updates the skin map to indicate that the pixel represents skin. Control then passes to step 735.

In step 735, if ROI determination block 360 determines that all pixels in the skin map have been processed control passes to step 745, else control passes to step 740. In step 740, ROI determination block 360 receives a status bit of a next pixel from the skin map. Control then passes to step 720.

In step 745, ROI determination block 360 stores the updated skin map. Control then passes to step 750. In step 750, ROI determination block 360 sets the comparison number to a new value. Control then passes to step 755. In step 755, ROI determination block 360 receives a status bit corresponding to a pixel (as a subject pixel) from the skin map received in step 705. Control then passes to step 760.

In step 760, if the status bit indicates that the pixel represents skin, control passes to step 765, else control passes to step 775. In step 765, ROI determination block 360 determines from the skin map the number of pixels neighboring (immediately adjacent to) the subject pixel that also represent skin. Control passes to step 775 if ROI determination block 360 determines (from the corresponding values in the skin map) that the number of neighboring pixels representing skin is equal to or greater than the comparison number, else control passes to step 770.

In step 770, ROI determination block 360 updates the skin map to indicate that the pixel does not represent skin. Control then passes to step 775.

In step 775, if ROI determination block 360 determines that all pixels in the skin map have been processed control passes to step 785, else control passes to step 780.

In step 780, ROI determination block 360 receives a status bit of a next pixel from the skin map. Control then passes to step 760. In step 785, if ROI determination block 360 determines that preprocessing of the skin has been performed to a desired level of confidence, control passes to step 795, else control passes to step 790. In an embodiment, a desired level of confidence level is deemed to be reached if a predetermined number of iterations of steps 715 through 775 have been performed. However, different approaches (e.g., based on different criteria such as number of pixels added/removed in an iteration) can be undertaken until a desired level of confidence is attained.

In step 790, ROI determination block 360 sets the comparison number to a new value. In an embodiment, the comparison value set in this step is smaller than the comparison values set in the first iteration of steps 710 and 750. Control then passes to step 715, in which ROI determination block 360 receives the status bit for a first pixel again from the skin map, and the operations of the flowchart are repeated.

In step 795, ROI determination block 360 stores the preprocessed (updated) skin map for further processing. Control then passes to step 799, in which the flowchart ends.

In the flowchart of FIG. 7B all steps are identical to correspondingly (similarly) numbered steps in FIG. 7A, except for the following:

(a) Step 710 is not present, and control passes to step 715 after execution of step 705;

(b) In step 725, if ROI determination block 360 determines that if at least one ROI neighboring pixel is present which is indicated by the skin map as representing skin, control passes to step 730, else control passes to step 735; and (c) If in step 775 ROI determination block 360 determines that all pixels in the skin map have been processed, control passes to step 795 in which the updated skin map is stored, and then to step 799 in which the flowchart ends. It may be observed from the flowchart of FIG. 7A that several iterations of each of the two loops formed by steps 715-720-725-730-735-740-720, and by steps 755-760-765-770-775-780-760 may be performed, while only one iteration of each of the loops is performed in the flowchart of FIG. 7B.

The skin maps stored at the end (i.e., step 795) of flowcharts of FIGS. 7A and 7B are then processed as illustrated in FIG. 8A. Merely for reference, the skin maps generated at the end of processing by the flowcharts of FIGS. 7A and 7B are respectively referred to as skin map A and skin map B. The flowchart of FIG. 8A starts in step 801, in which control passes immediately to step 810.

In step 810, ROI determination block 360 receives the updated skin maps (A and B) stored at end (step 795) of Flowcharts of FIGS. 7A and 7B. Control then passes to step 820.

In step 820, for each pixel location in skin maps A and B, ROI determination block 360 performs a logical AND operation of the corresponding status bits, and writes the ANDed value to the corresponding pixel location in a "final" skin map. Control then passes to step 830.

In step 830, ROI determination block 360 stores the 'final' skin map for further processing. Control then passes to step 839 in which the flowchart ends.

It may be observed that the operations of the steps of flowcharts 7A, 7B and 8A may add additional pixels in a skin map as representing skin and remove some pixels from being considered skin. In particular, the loop formed by steps 715-720-725-730-735-740-720 operates to mark 'non-skin' pixels as skin-pixels, and the loop formed by steps 755-760-765-770-775-780-760 operates to remove skin pixels from being considered skin.

As an example, pixels representing eye, although not of face color, would need to be identified (and included) as part of a facial region. The loop formed by steps 715-720-725-730-735-740-720 may cause addition of 'skin' pixels (pixels in the eye region added as 'skin' pixels) to the skin map, and thus enables identification of such pixels also as potentially lying in a facial region.

Noise and other undesirable effects may erroneously cause a pixel otherwise not representing skin to be captured as a 'skin' pixel in the skin map prior to the processing of FIGS. 7A and 7B. The loop formed by steps 755-760-765-770-775-780-760 may cause such a pixel to be removed from the pixel map. Also, it is noted that the operation of the steps of flowcharts 7A and 7B, and the ANDing operation in flowchart of FIG. 8A may be performed to prevent or minimize the probability of two separate but closely spaced skin clusters from merging.

At the completion of preprocessing, the 'final' skin map (obtained at step 830 of FIG. 8A) may contain one or more 'clusters' of pixels (a group of adjoining/contiguous pixel locations) identified as skin pixels, each cluster potentially representing a facial region.

10. Identifying and Marking Potential Facial Regions

Figure 8B:
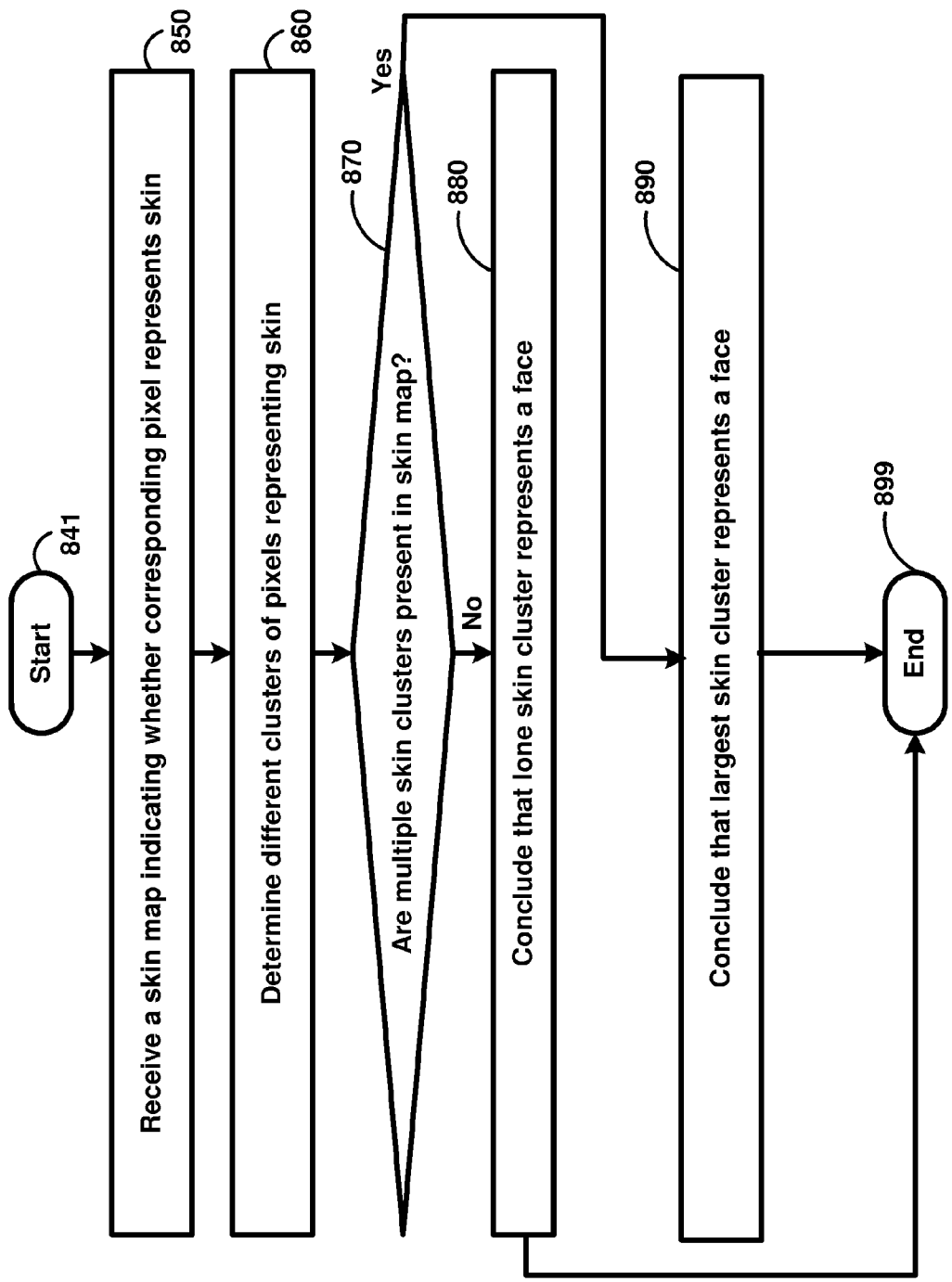
FIG. 8B is a flowchart illustrating the manner in which one or more clusters (groups) of pixels are identified and marked as potentially representing a desired facial region in one embodiment.

FIG. 8B is a flowchart illustrating the manner in which ROI determination block 360 identifies and marks one or more cluster (group) of pixels as potentially representing a desired facial region in one embodiment. The flowchart is described with respect to a single cluster (termed 'first' cluster, merely to simplify the following description), however relevant steps (850-890) in the flowchart may be performed to locate all skin clusters present in the skin map. The flowchart starts in step 841, in which control passes immediately to step 850.

In step 850, ROI determination block 360 receives a skin map indicating whether each corresponding pixel represents skin. The skin map may be preprocessed, for example, as described above with respect to the flowchart of FIGS. 7A, 7B and 8A. Control then passes to step 860.

In step 860, ROI determination block 360 determines different clusters of pixels representing skin by examining the skin map. In general, skin pixels in contiguous locations, reasonably representing dimensions of a face may be viewed as a cluster. Ideally, the number of clusters equals the number of faces (assuming non-overlap of faces in the captured image) in the image. Control then passes to step 870.

In step 870, ROI determination block 360 checks whether there are multiple skin clusters present in skin map. Control passes to step 880 if there is only a single skin cluster, or else to step 890. In step 880, ROI determination block 360 concludes that the lone skin cluster represents a face. Control then passes to step 899, in which the flowchart ends.

In step 890, ROI determination block 360 concludes that the largest skin cluster represents a face (facial region, in general). Control then passes to step 899.

Having thus identified the facial region of interest, ROI determination block 360 provides the identities (for example, in the form of location co-ordinates or macro-block number) of macro-blocks representing the ROI (i.e., 'ROI macro-blocks') and macro-blocks not representing the ROI (i.e., 'non-ROI macro-blocks') to rate controller 330. (When only a portion of macro-block contains skin pixels, ROI determination block may designate the macro-block as a ROI macro-block if at least half of the macro-block contains skin pixels, and as a non-ROI macro-block otherwise). Rate controller 330 then operates in a manner described above to allocate the available number of bits to the ROI and non-ROI portions.

It should be appreciated that processing unit 110A may be implemented in a combination of one or more of hardware, software and firmware. An embodiment in which processing unit 110A is implemented substantially in hardware is described above with respect to FIGS. 3 and 4.

An embodiment in which processing unit 110A is implemented substantially in software in which various features are operative by execution of corresponding software instructions is described next.

11. Software Implementation

Figure 9:
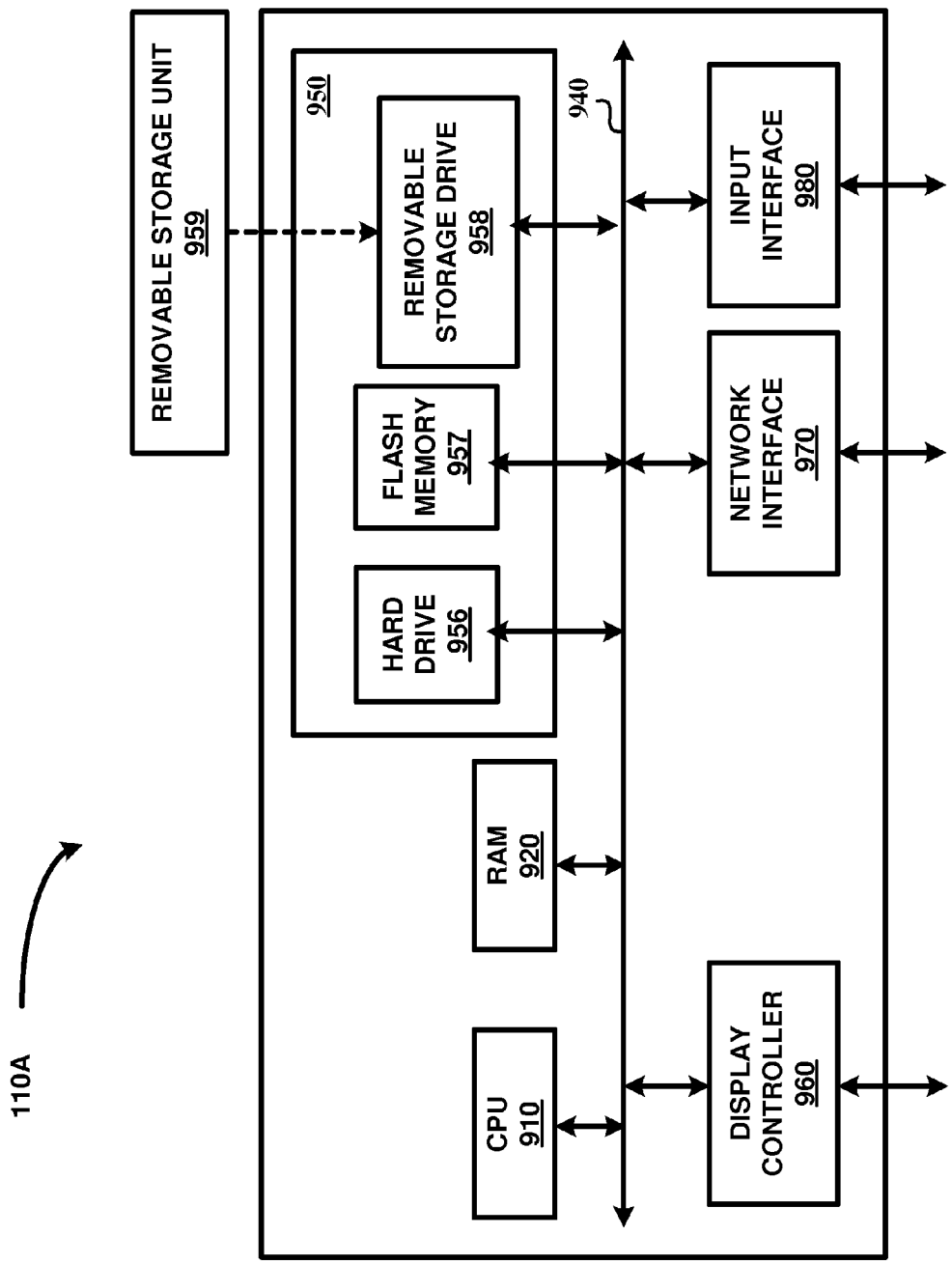
FIG. 9 is a block diagram illustrating the details of an embodiment of a processing unit in which various features of the present invention are operative by the execution of software instructions.

FIG. 9 is a block diagram illustrating the details of processing unit 110A in another embodiment. Processing unit 110A may contain one or more processors such as central processing unit (CPU) 910, random access memory (RAM) 920, secondary storage unit 950, display controller 960, network interface 970, and input interface 980. All the components may communicate with each other over communication path 940, which may contain several buses as is well known in the relevant arts. The components of FIG. 9 are described below in further detail.

CPU 910 may execute instructions stored in RAM 920 to provide several features of the present invention. CPU 910 may contain multiple processing units, with each processing unit potentially being designed for a specific task. Alternatively, CPU 910 may contain only a single general purpose processing unit. RAM 920 may receive instructions from secondary storage unit 950 using communication path 940. In addition, RAM 920 may store video frames received from a video camera, and corresponds to memory 350 of FIG. 3.

Display controller 960 generates display signals (e.g., in RGB format) to display unit 130A (FIG. 1) based on data/instructions received from CPU 910. Display controller 960 may correspond to display interface block 370 of FIG. 3.

Network interface 970 provides connectivity to a network (e.g., using Internet Protocol), and may be used to receive/transmit video frames. Network interface 970 may correspond to path interface 340 of FIG. 3. Input interface 980 may include interfaces such as keyboard/mouse, and interface for receiving video frames from video camera 120A. Input interface 980 may correspond to input block 310 of FIG. 3.

Secondary storage unit 950 may contain hard drive 956, flash memory 957, and removable storage drive 958. Some or all of the data and instructions may be provided on removable storage unit 959, and the data and instructions may be read and provided by removable storage drive 958 to CPU 910. Floppy drive, magnetic tape drive, CD_ROM drive, DVD Drive, Flash memory, removable memory chip (PCMCIA Card, EPROM) are examples of such removable storage drive 958. Alternatively, data and instructions may be copied to RAM 920 from which CPU 910 may execute. Groups of software instructions (for example, in compiled/object form or post-linking in a form suitable for execution by CPU 910) are termed as code.

Removable storage unit 959 may be implemented using medium and storage format compatible with removable storage drive 958 such that removable storage drive 958 can read the data and instructions. Thus, removable storage unit 959 includes a computer readable storage medium having stored therein computer software and/or data.

In general, the computer (or generally, machine) readable medium refers to any medium from which processors can read and execute instructions. The medium can be randomly accessed (such as RAM 920 or flash memory 957), volatile, non-volatile, removable or non-removable, etc. While the computer readable medium is shown being provided from within processing unit 110A for illustration, it should be appreciated that the computer readable medium can be provided external to processing unit 110A as well.

In this document, the term "computer program product" is used to generally refer to removable storage unit 959 or hard disk installed in hard drive 956. These computer program products are means for providing software to CPU 910. CPU 910 may retrieve the software instructions, and execute the instructions to provide various features of the present invention described above.

CONCLUSION

While various embodiments of the present invention have been described above, it should be understood that they have been presented by way of example only, and not limitation. Thus, the breadth and scope of the present invention should not be limited by any of the above described exemplary embodiments, but should be defined only in accordance with the following claims and their equivalents.

What is claimed is:

1. A method of representing a video frame using an available number of bits, said method comprising:
identifying a region of interest (ROI) in a video frame;
determining a first portion in a reference frame substantially matching said ROI in said video frame, wherein said reference frame is a time instance earlier than said video frame;
computing a first complexity parameter signifying a change in pixel values in said ROI in said video frame relative to said first portion in said reference frame,
computing a first quantization parameter having positive correlation with each of said first complexity parameter and a ratio of an area of said ROI to an area of said video frame;
encoding a first set of pixel changes based on said first quantization parameter to generate a first set of encoded pixels, wherein said first set of pixel changes represents changes of said ROI in said video frame in relation to said first portion in said reference frame;
generating an encoded video frame representing said video frame comprising said first set of encoded pixels;
receiving said video frame and said reference frame, wherein each of said video frame and said reference frame represent images of a scene, with said reference frame representing said scene at a time instance earlier than said video frame;
determining a second portion in said reference frame matching a non-ROI region in said video frame
computing a second complexity parameter signifying a change in pixel values in said non-ROI in said video frame relative to said second portion in said reference frame;
receiving a second quantization parameter for said video frame;
computing a third quantization parameter proportionate to said first complexity parameter; and
encoding a second set of pixel changes using said third quantization parameter to generate a second set of encoded pixels, wherein said second set of pixel changes represents changes of said non-ROI in said video frame in relation to said reference frame, wherein said generating said encoded video frame representing said video frame further comprises said second set of encoded pixels.

2. The method of claim 1, further comprising including said second quantization parameter and said third quantization parameter as quantization parameters in said encoded video frame.

3. The method of claim 1, wherein said ROI comprises a facial region, and wherein a pixel present in said ROI is determined to represent a facial region based on chrominance values representing said pixel.

4. The method of claim 3, wherein said chrominance values correspond to Cb and Cr values in a YCbCr color space, with said pixel being determined to represent a facial region if a value of said Cb lies in a range 67 to 123, a value of said Cr lies in a range 136 to 175, and a value of a sum of said Cb and Cr lies in a range 220 to 275.

5. The method of claim 1, further comprising transmitting said encoded video frame on a transmission line having a bandwidth determined by said available number of bits.

6. The method of claim 1, wherein said video frame comprises a plurality of macro blocks in said ROI, and wherein said computing said first complexity parameter and said computing said second complexity parameter comprises:
locating a corresponding block in said reference frame matching each of said plurality of macro blocks;
computing a first sum of absolute difference (SAD(ROI)) of corresponding pixel values in all of a set of macro blocks forming said ROI relative to the corresponding block in said reference frame;
computing a second sum of absolute difference (SAD(non-ROI)) of corresponding pixel values in all of a set of macro blocks forming said non-ROI relative to the corresponding block in said reference frame, wherein said (SAD(ROI)) and said (SAD(non-ROI)) respectively are said first complexity parameter and said second complexity parameter.

7. The method of claim 6, wherein said computing said second quantization parameter comprises:

computing a parameter 'QPPReferencefactor' according to an equation:

QPPReferencefactor=−4*N(non-ROI)/N(frame) wherein, N(non-ROI) is the number of macro-blocks in the non-ROI in said video frame N(frame) is the total number of macro-blocks in said video frame, computing a first temporary value Qptemp(ROI) according to:

QPtemp(ROI)=QP(frame)+QPPReferencefactor wherein, QP(frame) represents said first quantization parameter, wherein said second quantization parameter (QP(ROI)) is determined according to:

QP(ROI)=MAX(MINQP, QPtemp(ROI)) wherein, MINQP is the minimum value of quantization parameter corresponding to said available number of bits MAX is the maximum-value operator.

8. The method of claim 7, wherein said computing said third quantization parameter comprises: looking up a table to determine a Qstep(ROI) using said QP(ROI) as input to said table;

computing a Qstep(non-ROI) according to: Qstep(non-ROI)=[SAD(non-ROI)*Qstep(frame)*Qstep(ROI)]/ [{SAD(frame)*Q−step(ROI)}−{SAD(ROI)*Qstep (frame)}], wherein Qstep(frame) is the quantization step size for the entire frame, and is obtained by looking up in said table with the value of said QP(frame) as an input; and looking up in said table using said Qstep(non-ROI) as input to determine said third quantization parameter.

9. The method of claim 8, further comprising:

computing a second temporary value QPtemp2(non-ROI), according to:

QPtemp2(non-ROI)=MAX(QP(frame)+2, QPtemp1(non-ROI)) wherein,

QP(frame) represents said first quantization parameter,

QPtemp1 (non-ROI) is obtained by said looking up in said table using said Qstep(non-ROI), and determining said third quantization parameter QP(non-ROI) according to: QP(non-ROI)=MIN(MAXQP, QPtemp2(non-ROI)) wherein, QPtemp2(non-ROI) is said second temporary value, and MIN is the minimum value operator, MAXQP is the maximum value of quantization parameter corresponding to said available number of bits.

10. A non-transitory computer-readable storage medium carrying one or more sequences of instructions for causing a system to represent a video frame using an available number of bits, wherein execution of said one or more sequences of instructions by one or more processors contained in said system causes said system to perform a method for representing a video frame using an available number of bits, the method comprising:

identifying a region of interest (ROI) in a video frame;

determining a first portion in a reference frame substantially matching said ROI in said video frame, wherein said reference frame is a time instance earlier than said video frame;

computing a first complexity parameter signifying a change in pixel values in said ROI in said video frame relative to said first portion in said reference frame, computing a first quantization parameter having positive correlation with each of said first complexity parameter and a ratio of an area of said ROI to an area of said video frame;

encoding a first set of pixel changes based on said first quantization parameter to generate a first set of encoded pixels, wherein said first set of pixel changes represents changes of said ROI in said video frame in relation to said first portion in said reference frame;

generating an encoded video frame representing said video frame comprising said first set of encoded pixels;

receiving said video frame and said reference frame, wherein each of said video frame and said reference frame represent images of a scene, with said reference frame representing said scene at a time instance earlier than said video frame;

determining a second portion in said reference frame matching a non-ROI region in said video frame computing a second complexity parameter signifying a change in pixel values in said non-ROI in said video frame relative to said second portion in said reference frame;

receiving a second quantization parameter for said video frame;

computing a third quantization parameter proportionate to said first complexity parameter; and encoding a second set of pixel changes using said third quantization parameter to generate a second set of encoded pixels, wherein said second set of pixel changes represents changes of said non-ROI in said video frame in relation to said reference frame, wherein said generating said encoded video frame representing said video frame further comprises said second set of encoded pixels.

11. A computer system, comprising:

a bus, a processor coupled to the bus; and a non-transitory computer readable storage medium coupled to the bus and comprising instructions tangibly stored therewith, which when executed by the processor, cause the computer system to perform a a method for representing a video frame using an available number of bits, the method comprising:

identifying a region of interest (ROI) in a video frame;

determining a first portion in a reference frame substantially matching said ROI in said video frame, wherein said reference frame is a time instance earlier than said video frame;

computing a first complexity parameter signifying a change in pixel values in said ROI in said video frame relative to said first portion in said reference frame, computing a first quantization parameter having positive correlation with each of said first complexity parameter and a ratio of an area of said ROI to an area of said video frame;

encoding a first set of pixel changes based on said first quantization parameter to generate a first set of encoded pixels, wherein said first set of pixel changes represents changes of said ROI in said video frame in relation to said first portion in said reference frame;

generating an encoded video frame representing said video frame comprising said first set of encoded pixels;

receiving said video frame and said reference frame, wherein each of said video frame and said reference frame represent images of a scene, with said reference frame representing said scene at a time instance earlier than said video frame;

determining a second portion in said reference frame matching a non-ROI region in said video frame computing a second complexity parameter signifying a change in pixel values in said non-ROI in said video frame relative to said second portion in said reference frame;

receiving a second quantization parameter for said video frame;

computing a third quantization parameter proportionate to said first complexity parameter; and encoding a second set of pixel changes using said third quantization parameter to generate a second set of encoded pixels, wherein said second set of pixel changes represents changes of said non-ROI in said video frame in relation to said reference frame, wherein said generating said encoded video frame representing said video frame further comprises said second set of encoded pixels.

* * * * *